(12) United States Patent
Devila et al.

(10) Patent No.: US 7,761,633 B2
(45) Date of Patent: Jul. 20, 2010

(54) ADDRESSABLE SERIAL PERIPHERAL INTERFACE

(75) Inventors: Yaki Devila, Raanana (IL); Alon Ferentz, Bat Yam (IL); Roni Blaut, Netan (IL); Amir Peleg, Tel Aviv (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 345 days.

(21) Appl. No.: 12/018,863

(22) Filed: Jan. 24, 2008

(65) Prior Publication Data
US 2008/0183928 A1 Jul. 31, 2008

Related U.S. Application Data

(60) Provisional application No. 60/889,570, filed on Feb. 13, 2007, provisional application No. 60/886,982, filed on Jan. 29, 2007.

(51) Int. Cl.
*G06F 13/00* (2006.01)
(52) U.S. Cl. ............... 710/110; 710/3; 340/825.52
(58) Field of Classification Search .......... 710/110, 710/305–306, 3–4, 9; 713/600; 340/825.52, 340/10.1–10.2, 10.4–10.42
See application file for complete search history.

(56) References Cited

U.S. PATENT DOCUMENTS

| 4,958,277 | A | 9/1990 | Hill et al. |
|---|---|---|---|
| 6,097,657 | A | 8/2000 | Ng et al. |
| 6,304,921 | B1 | 10/2001 | Rooke |
| 6,496,487 | B2 | 12/2002 | Franz et al. |
| 6,715,000 | B2 | 3/2004 | Cheung et al. |
| 6,922,790 | B2 | 7/2005 | Smith et al. |
| 7,051,143 | B2 * | 5/2006 | White et al. ............... 710/305 |
| 7,069,352 | B2 | 6/2006 | Pezzini |
| 7,095,247 | B1 | 8/2006 | Tang et al. |
| 7,519,849 | B2 * | 4/2009 | Kim et al. ............... 713/600 |
| 7,660,968 | B2 * | 2/2010 | Alfano et al. ............... 712/38 |

FOREIGN PATENT DOCUMENTS

WO 02/093394 A2 11/2002

OTHER PUBLICATIONS

Motorola, Inc., SPI Block Guide V03.06; Revised Feb. 4, 2003; Document No. S12SPIV3/D.
Office Action Dated Sep. 25, 2009 from China Patent Office for parallel patent application 200810096330.X.

* cited by examiner

*Primary Examiner*—Clifford H Knoll
(74) *Attorney, Agent, or Firm*—Simon Kahn

(57) ABSTRACT

An addressable SPI bus and an associated communication protocol. The addressable SPI bus comprises a plurality of slaves each exhibiting a particular address and a shift register whose output is connected to a common MISO bus by a buffer exhibiting a three state output, also known as a tri-state output. The master asserts a single SS line, which is connected in parallel to each of the plurality of slaves, indicating the beginning of a frame, and transmits via the MOSI bus the address of a particular slave of the plurality of slaves, denoted interchangeably the target or destination slave. Responsive to the received address, the target slave enables the three state output associated therewith thus transmitting the output of the target slave shift register to the master via the MISO bus.

27 Claims, 7 Drawing Sheets

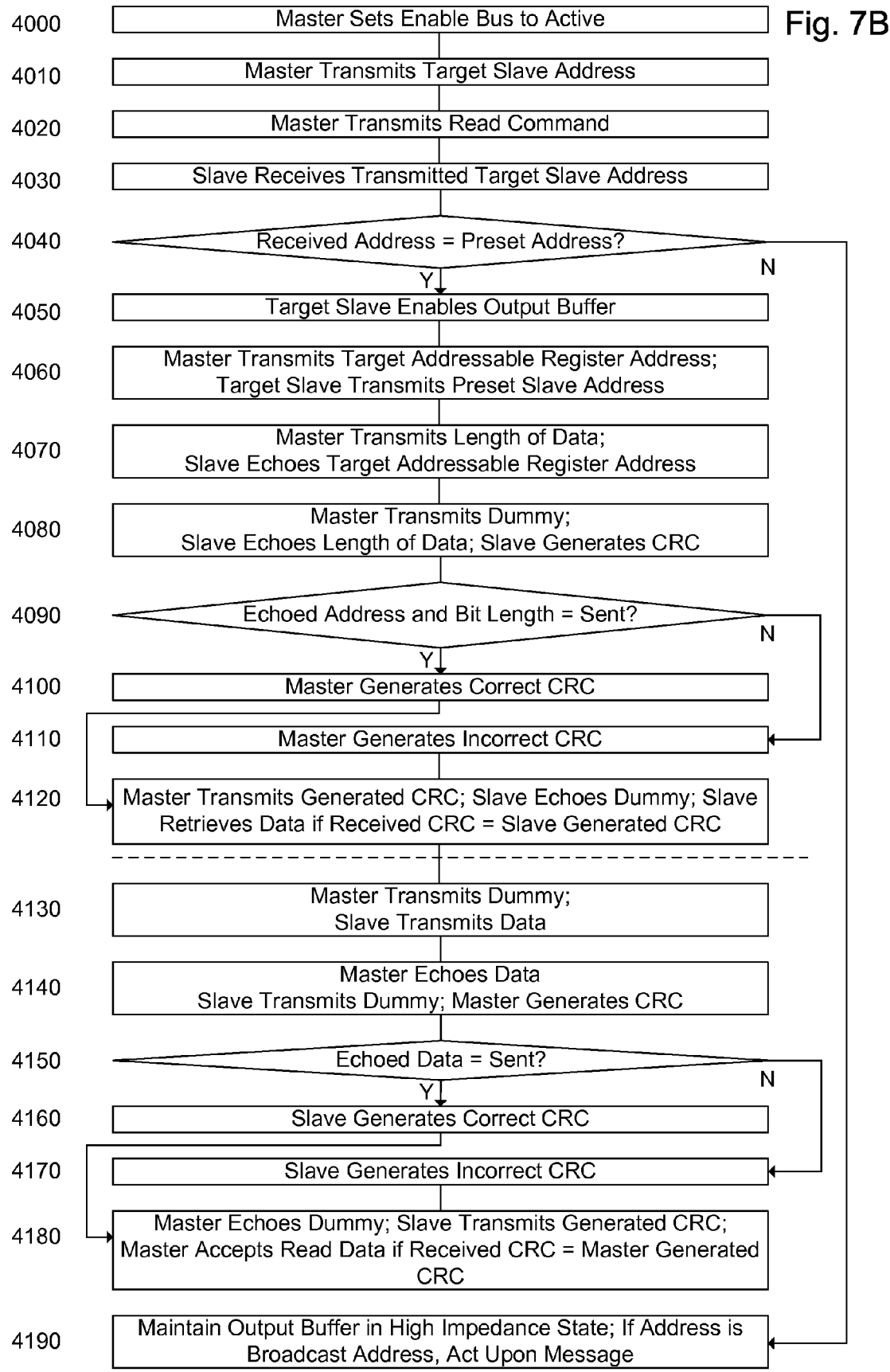

ADDRESSABLE SERIAL PERIPHERAL INTERFACE

CROSS-REFERENCE TO RELATED APPLICATIONS

This application claims priority from U.S. Provisional Patent Application Ser. No. 60/886,982 filed Jan. 29, 2007 entitled "Addressable Serial Peripheral Interface" and U.S. Provisional Patent Application Ser. No. 60/889,570 filed Feb. 13, 2007 entitled "Addressable Serial Peripheral Interface", the entire contents of both of which are incorporated herein by reference.

BACKGROUND OF THE INVENTION

The invention relates generally to the field of serial communication between components of a system, and more particularly to a protocol for an addressable serial peripheral interface.

Serial interfaces are widely used for data communications between components of a system, and in particular between a control unit and its peripherals. One common example of such a serial interface is the serial peripheral interface (SPI) described in U.S. Pat. No. 4,958,277 issued Sep. 18, 1990 to Hill et al, entitled "Queued Serial Peripheral Interface for Use in a Data Processing System", and in U.S. Pat. No. 7,069,352 issued Jun. 27, 2006 to Pezzini entitled "Serial Peripheral Interface and Related Methods", the entire contents of both of which are incorporated herein by reference.

The SPI is a full duplex synchronous data link in which devices communicate in a master slave arrangement. One device acts as the SPI master which initiates a data frame by outputting a serial clock, conventionally denoted SCLK. SCLK is used by the slave to output serial data for transmission to the master, and/or to clock in serial data received from the master. Each SPI device exhibits a serial data output line and a serial data input line, labeled respectively as master out/slave in (MOSI) and master in/slave out (MISO). A plurality of slave devices may be used provided that the master supplies a separate slave select output, denoted SS, for each slave device. Unfortunately, such a system requires a dedicated SS pin for each slave device, which is costly. In an embodiment in which a plurality of slaves are provided, the SPI is known as an SPI bus, since all communication lines are shared.

An additional difficulty with an SPI bus is the lack of built in acknowledgement. In particular, the master in an SPI bus may transmit data to a non-existent slave, without receiving an error indication. Furthermore data transmitted to the slave, or read from the slave by the master, may incur errors in transmission. Typically, an error detection mechanism such as a cyclic redundancy check (CRC) is utilized, however no mechanism is supplied to confirm the existence of errors to the source of data, which may then retransmit the data if required.

Additionally, such a technique requires that the data to be transmitted from the slave to the master be immediately available responsive to SCLK of the master. In an embodiment in which the slave exhibits a plurality of addressable locations, such as addressable registers, in accordance with the prior art a particular slave is selected via an SS pin and an address of the addressable register to be read, denoted the target addressable register, is output by the master. After receipt of the address by the slave, the contents of the target addressable register is retrieved and preferably loaded via an output buffer to the slave shift register to be read out by the master clock. There often exists a latency in the retrieval of the contents of the target addressable register and in one embodiment a wait state is exhibited by the master, delaying the issuance of SCLK thereby supplying time for the slave to retrieve the data from the addressable register. Unfortunately, in certain applications the wait state is insufficient for reliable data retrieval.

There is thus a long felt need for an improved bus arrangement allowing for multiple slaves to be connected to a master without requiring a slave select for each slave. Additionally, there is a need for a communication protocol for use with an SPI bus providing acknowledgement, and preferably providing error detection and notification. There is also a need for a communication protocol for use with an SPI bus exhibiting a reduced sensitivity to delay.

SUMMARY OF THE INVENTION

Accordingly, it is a principal object of the present invention to overcome the disadvantages of prior art by providing an addressable SPI bus and an associated communication protocol. In one embodiment the addressable SPI bus comprises a plurality of slaves each exhibiting a particular address and a shift register whose output is connected to a common MISO bus by a buffer exhibiting a three state output, also known as a tri-state output. The master asserts a single SS line, which is connected in parallel to each of the plurality of slaves, indicating the beginning of a frame, and transmits via the MOSI bus the address of a particular slave of the plurality of slaves, denoted interchangeably the target or destination slave. Responsive to the received address, the target slave enables the three state output associated therewith thus transmitting the output of the target slave shift register to the master via the MISO bus.

In one embodiment, the target slave outputs the particular slave address as an acknowledge and error detection signal. In another embodiment, the transmitted data and/or addresses are echoed back to the data source, and the echoed data and/or addresses are compared with the sent data and/or addresses. In the event that the echoed back data and/or addresses match the transmitted data and/or addresses, a CRC is generated and transmitted to confirm data accuracy. In the event that the echoed back data and/or addresses does match the transmitted data and/or addresses, an incorrect CRC is generated and transmitted to confirm that data should be discarded.

In another embodiment, the master first outputs the address of the target addressable register for which data is to be read or written, and subsequently outputs the address of the target slave. Each slave, responsive to the received target addressable register address, retrieves data from the addressable register corresponding to the received target addressable register address. Each slave receives the subsequently output target slave address, and compares the target slave address with its particular address. The target slave enables the three state output associated therewith and transmits the retrieved data to the master via the MISO bus with reduced latency.

In one embodiment the invention provides for an addressable serial peripheral interface bus arrangement comprising: a master; a plurality of slaves, each of the slaves having associated therewith a particular slave address; a first and a second communication link connecting the master to each of the plurality of slaves, the first communication link different than the second communication link, the plurality of slaves being connected in parallel to the master; a clock, associated with the master and connected to each of the plurality of slaves, operative to clock data transmitted via the first communication link out of the master and into each of the plurality of slaves; and an enable control line, responsive to the master, and connected to each of the plurality of slaves in parallel, wherein the master is operative to transmit via the first communication link, responsive to the enable control line exhibiting an active signal, a target address, and wherein each of the plurality of slaves is operative to: receive, from the master, via the first communication link the target address; compare the received target address with the associated particular slave address; and transmit, only in the event the received target address is consonant with the associated particular slave address, first data via the second communication link responsive to the enable control line exhibiting the active signal and responsive to the clock, the transmitting slave being denoted the responding slave.

In one embodiment the invention provides for a method of bus communication comprising: providing a master; providing a plurality of slaves; providing for each of the provided plurality of slaves a particular slave address; providing a clock connected to each of the master and the plurality of slaves; providing an enable control line responsive to the master and connected to each of the plurality of slaves; connecting the master and the plurality of slaves by a first and a second communication link, the first communication link different than the second communication link, the plurality of slaves being connected in parallel to the master; transmitting, from the master via the first communication link, a target address, the transmitting associated with the provided clock and responsive to an active signal on the enable control line; receiving, at each of the provided plurality of slaves from the master, via the first communication link, the target address; comparing the received target address with the particular slave address; and transmitting, only in the event the received target address is consonant with the associated particular slave address, first data via the second communication link responsive to the provided clock and the active signal on the enable control line, the transmitting slave being denoted the responding slave.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding sections or elements throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 7B is a high-level flow chart of the operation of the system of FIG. 1 in accordance with the read embodiment of the third data transfer protocol of FIG. 6B.

DETAILED DESCRIPTION OF THE PREFERRED EMBODIMENTS

Figure 1:
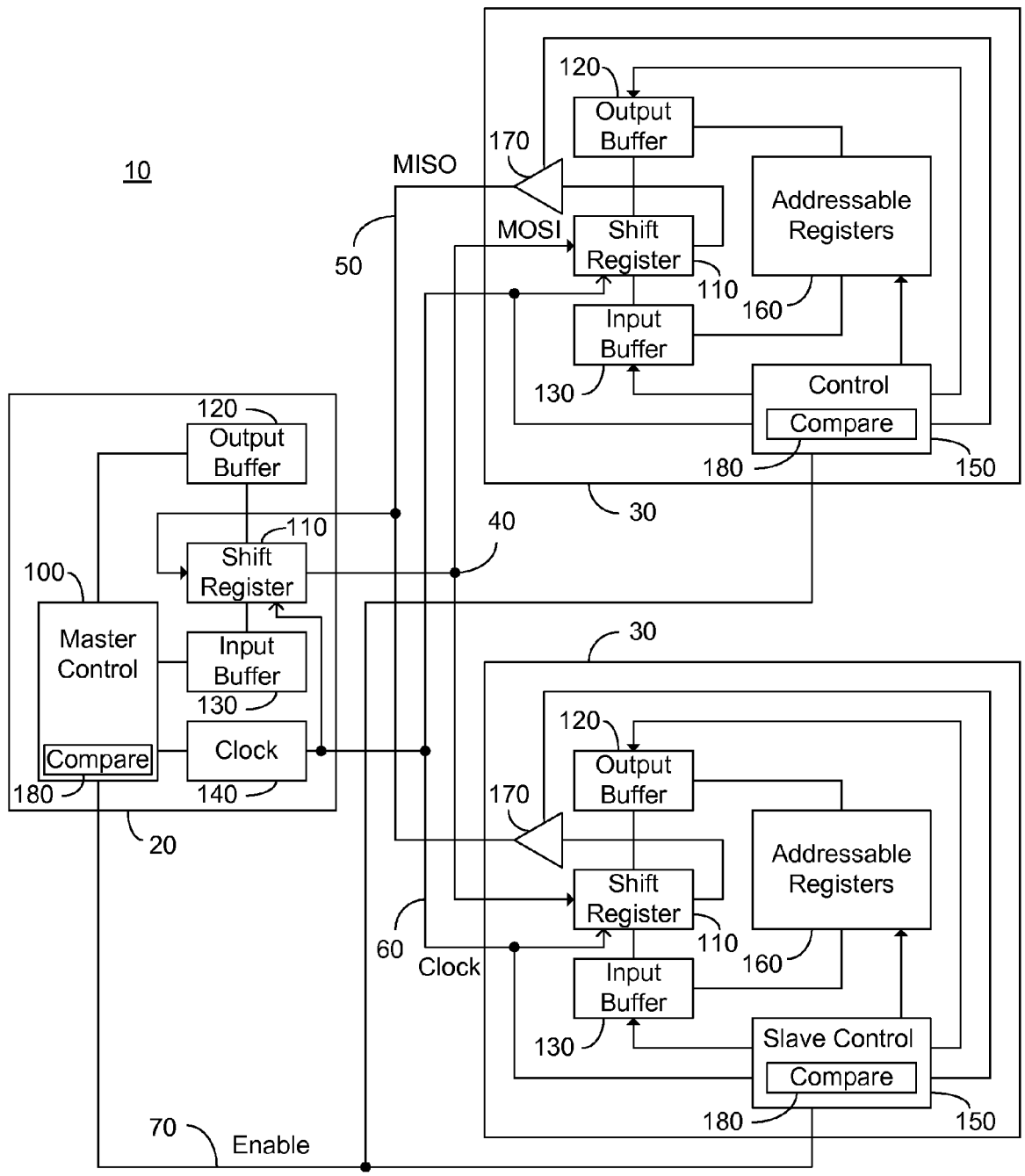
FIG. 1 is a high-level block diagram of a system exhibiting an addressable SPI bus according to a principle of the invention.

The present embodiments enable an addressable SPI bus and an associated communication protocol. The addressable SPI bus comprises a plurality of slaves each exhibiting a particular address and a shift register whose output is connected to a common MISO bus by a buffer exhibiting a three state output, also known as a tri-state output. The master asserts a single SS line, which is connected in parallel to each of the plurality of slaves, indicating the beginning of a frame, and transmits via the MOSI bus the address of a particular slave of the plurality of slaves, denoted the target slave. Responsive to the received address, the target slave enables the three state output associated therewith thus transmitting the output of the target slave shift register to the master via the MISO bus.

In one embodiment, the target slave outputs the particular slave address as an acknowledge and error detection signal. In another embodiment, the transmitted data and/or addresses are echoed back to the data source, and the echoed data and/or addresses are compared with the sent data and/or addresses. In the event that the echoed back data and/or addresses match the transmitted data and/or addresses, a CRC is generated and transmitted to confirm data accuracy. In the event that the echoed back data and/or addresses does match the transmitted data and/or addresses, an incorrect CRC is generated and transmitted to confirm that data should be discarded.

In another embodiment, the master first outputs the address of the target addressable register for which data is to be read or written, and subsequently outputs the address of the target slave. Each slave, responsive to the received target addressable register address, retrieves data from the addressable register corresponding to the received target addressable register address. Each slave receives the subsequently output target slave address, and compares the target slave address with its particular address. The target slave enables the three state output associated therewith and transmits the retrieved data to the master via the MISO bus with reduced latency.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high-level block diagram of a system 10 exhibiting an addressable SPI bus according to a principle of the invention. System 10 comprises a master device 20, a plurality of slave devices 30, a MOSI bus 40, a MISO bus 50, a clock bus 60 and an enable bus 70. MOSI bus 40, MISO bus 50, clock bus 60 and enable bus 70 constitute an addressable SPI bus in accordance with a principle of the invention. Master device 20 comprises: a master control 100 comprising a compare functionality 180; a shift register 110; an output buffer 120; an input buffer 130; and a clock 140. Each slave device 30 comprises: a shift register 110; an output buffer 120; an input buffer 130; a plurality of addressable registers 160; a slave control circuitry 150 comprising compare functionality 180; and an output buffer 170. Output buffer 170 is a three state buffer.

Each of input buffer 130 of master device 20, clock 140 and output buffer 120 of master device 120 are responsive to a particular output of master control 100. Enable bus 70 is connected to a particular output of master control 100. The output of clock 140 is connected to clock bus 60 and to the clocking input of shift register 110 of master device 20.

Each input buffer 130 of the respective slave device 30 and output buffer 120 of the respective slave device 30 are in communication with slave control circuitry 150 and responsive thereto. Each of the plurality of addressable registers 160 are responsive to an output of slave control circuitry 150 and in communication with output buffer 120 and input buffer 130 of the respective slave device 30. Enable bus 70 is connected to an input of each slave control circuitry 150 and clock bus 60 is connected to the clocking input of each shift register 110 and to a particular input of each slave control circuitry 150. The input of shift register 110 of each slave device 30 is connected to MOSI bus 40 and the output of shift register 110 of each slave device 30 is connected via a respective output buffer 170 to MISO bus 50. The control input of each output buffer 170 is connected to a particular output of the respective slave control circuitry 150.

In operation, in a first data transfer protocol embodiment as will be described further hereinto below in relation to FIGS. 2A, 2B and FIG. 4, master control 100 addresses data to, or reads data from, a particular addressable register 160, denoted target addressable register 160, of a particular slave device 30, denoted target slave device 30, by first loading the address of target slave device 30 into output buffer 120 of master device 20 and transferring the address to shift register 110 of master device 20. Master control 100 then sets enable bus 70 to active and clocks the address out of shift register 110 of master device 20 via clock 140. The address appears on MOSI bus 40, and is clocked, by clock 140 appearing on clock bus 60, into shift register 110 of each slave device 30. In an exemplary embodiment, a single bit of the address further comprises a read or write bit. Output buffer 170 of each slave device 30 is initially in a high impedance state.

Slave control circuitry 150 of each slave device 30 reads the incoming address via respective input buffer 130, and compares it with a preset slave address via compare functionality 180. In one embodiment the preset slave address is set via resistor values as described in U.S. Pat. No. 5,646,609 to O'Brien issued Jul. 8, 1997, the entire contents of which is incorporated herein by reference. In another embodiment the preset slave address is downloaded from a host (not shown) as part of an initial configuration stage. In yet another embodiment the preset slave address is set by connections of selected pins of the slave device 30 to particular voltage values.

In the event that the incoming address of target slave device 30 matches the preset address of a particular slave device 30, i.e. the particular slave device is target slave device 30, slave control circuitry 150 of target slave device 30 preferably loads its preset address into output buffer 120 of target slave device 30, transfers it to shift register 110 of target slave device 30 and enables the output of shift register 110 of target slave device 30 by enabling the respective output buffer 170.

Master control 100 then loads the address of the particular addressable register 160, denoted target addressable register 160, into output buffer 120, transfers the address to shift register 110 of master device 20 and clocks the address of target addressable register 160 out of shift register 110 of master device 20 via clock 140. The clocking of shift register 110 of target slave device 30 via clock bus 60, clocks out of shift register 110 of target slave device 30 the preset address loaded therein, which appears on MISO bus 50 and is clocked into shift register 110 of master device 20. Preferably, master control 100 reads the received preset address of the responding slave device 30, via input buffer 130 of master device 20, and preferably compares the received preset address with the transmitted target slave address via compare functionality 180. In the event of a mismatch, a fault error is flagged, and the routine proceeds to an error handler. Slave control circuitry 150 copies the address of target addressable register 160 into the respective input buffer 130.

In the event of a write command, upon completion of the transfer of the address of target addressable register 160 from master device 20 to slave device 30, and in particular to target slave device 30, master control 100 transfers data to be written to target addressable register 160 from output buffer 120 to shift register 110 of master device 20 and clocks the data out of shift register 110 of master device 20 via clock 140. The clocking of shift register 110 of target slave device 30, received via clock bus 60, clocks out of shift register 110 of target slave device 30 the address of target addressable register 160 previously received from MOSI bus 40, which appears on MISO bus 50 and is clocked into shift register 110 of master device 20. Preferably, master control 100 reads the echoed address of target addressable register 160 via input buffer 130, and preferably compares it, via compare functionality 180, with the transmitted target addressable register address. In the event of a mismatch, a fault error is flagged, and the routine proceeds to an error handler.

Upon completion of the transfer of data from master device 20 to slave device 30, slave control circuitry 150 copies the received data from respective shift register 110 to respective input buffer 130 and writes the copied data to the target addressable register 160 responsive to the received address previously stored in input buffer 130.

Master control 100 loads shift register 110 of master device 20 with dummy data via respective output buffer 120 and clocks the dummy data loaded out of shift register 110 of master device 20 via clock 140. The clocking of shift register 110 of target slave device 30, received via clock bus 60, clocks out of shift register 110 of target slave device 30 the data previously received from master device 20 which appears on MISO bus 50 and is clocked into shift register 110 of master device 20. Preferably, master control 100 reads the echoed data received via input buffer 130, and compares it with the data sent via compare functionality 180. In the event of a mismatch, a fault error is flagged, and the routine proceeds to an error handler.

In the event of a read command, upon completion of the transfer of the address of target addressable register 160 from master device 20 to slave device 30, and in particular to target slave device 30, slave control circuitry 150 retrieves the data from addressable register 160 responsive to the received address and stored in input buffer 130, and stores the retrieved read data in output buffer 120 of target slave device 30.

Master control 100 loads shift register 110 of master device 20 with dummy data via output buffer 120 and clocks the dummy data loaded out of shift register 110 of master device 20 via clock 140. The clocking of shift register 110 of target slave device 30 received via clock bus 60, clocks out of shift register 110 of target slave device 30 the address of target addressable register 160 previously received from MOSI bus 40, which appears on MISO bus 50 and is clocked into shift register 110 of master device 20. Preferably, master control 100 reads the echoed address of target addressable register 160 via input buffer 130, and preferably compares it, via compare functionality 180, with the transmitted address. In the event of a mismatch, a fault error is flagged, and the routine proceeds to an error handler.

Upon completion of the transfer of the echoed address of target addressable register 160 from slave device 30 to master device 20, slave control circuitry 150 transfers the read data stored in output buffer 120 to shift register 110 of slave device 30. Thus, latency of the retrieval from target addressable register 160 is accounted for by first acknowledging target addressable register 160 before read data in output buffer 120 need be valid.

Master control 100 loads shift register 110 of master device 20 with dummy data via respective output buffer 120 and clocks the dummy data loaded out of shift register 110 of master device 20 via clock 140. The clocking of shift register 110 of target slave device 30 received via clock bus 60, clocks out of shift register 110 of target slave device 30 the read data retrieved from target addressable register 160, which appears on MISO bus 50 and is clocked into shift register 110 of master device 20.

After data transfer is complete, master control 100 sets enable bus 70 inactive thus ending the frame.

Thus, in the first data transfer protocol embodiment, the transfer of both the target slave device 30 address and the target addressable register 160 address is acknowledged by target slave device 30 to master device 20 for software control and error detection. Data being written to a target addressable register 160 is further acknowledged. Advantageously, the acknowledgement of the target addressable register 160 address provides sufficient time to overcome any latency in the retrieval of data from target addressable register 160.

The above has been described in an embodiment in which each of target slave address 30, target addressable register address 160 and data to be written are acknowledged, however this is not meant to be limiting in any way. In another embodiment, one or more of target slave device 30 address, target addressable register 160 address and data to be written are not acknowledged thereby improving throughput.

The above has been described in an embodiment in which each data transfer addresses a particular one of a plurality of slave devices 30, however this is not meant to be limiting in any way. In another embodiment a broadcast address is further defined. Data transfer to the defined broadcast address is not responded to by any of the slave device 30, who maintain their respective output buffer 170 in a disabled state. In one further embodiment, each of the slave devices 30 responds to the broadcast in an identical fashion. In one yet further embodiment, a write to each of the slave devices is stored and only acted upon responsive to receipt of a particular broadcast message, thereby enabling synchronization between disparate slave devices 30.

In a second data transfer protocol embodiment, as will be described further hereinto below in relation to FIGS. 3A, 3B and FIG. 5, master control 100 addresses data to, or reads data from, a particular addressable register 160 of a particular slave device 30, denoted target slave device 30, by first loading the address of a particular addressable register 160, denoted target addressable register 160, into output buffer 120 of master device 20 and transferring the address to shift register 110 of master device 20. Master control 100 then sets enable bus 70 to active and clocks the address of target addressable register 160 out of shift register 110 of master device 20 via clock 140. The address appears on MOSI bus 40, and is clocked into shift register 110 of each of slave devices 30 via the clock signal appearing on clock bus 60.

Slave control circuitry 150 of each slave device 30 reads the incoming address via the respective input buffer 130, and begins to retrieve data from the corresponding addressable register 160. Output buffer 170 of each slave device 30 is preferably not enabled, and a signal characteristic of high impedance outputs thus appears on MISO bus 50. Preferably, each addressable register 160 is not set to erase on read, since in the second data transfer protocol an addressable register 160 of the slave device 30 not being the target is read, and the data will be lost.

Master control 100 then loads the address of the particular slave device 30, denoted target slave device 30, into output buffer 120, transfers the address to shift register 110 of master device 20 and clocks the address of target addressable register 160 out of shift register 110 of master device 20 via clock 140. In an exemplary embodiment, a single bit of the address further comprises a read or write bit.

The clocking of shift register 110 of slave device 30 received via clock bus 60, clocks out of shift register 110 of slave device 30 the address of target addressable register 160 received therein, however it does not appear on MISO bus 50 due to the non-enabled status of output buffer 170.

Slave control circuitry 150 of each slave device 30 reads the incoming address via the respective input buffer 130, and compares it with a preset slave address via compare functionality 180. In one embodiment the preset slave address is set via resistor values as described in U.S. Pat. No. 5,646,609 to O'Brien issued Jul. 8, 1997, incorporated above. In another embodiment the preset slave address is downloaded from a host (not shown) as part of an initial configuration stage. In yet another embodiment the preset slave address is set by connections of selected pins of the slave device 30 to particular voltage values. In the event that the incoming address representative of target slave device 30 matches the preset address of a particular slave device 30, i.e. the particular slave 30 is target slave device 30, target slave device 30 enables the output of shift register 110 of target slave device 30 by enabling output buffer 170.

In the event of a write command, upon completion of the transfer of the address of target slave device 30 from master device 20 to slave device 30, and in particular to target slave device 30, master control 100 transfers data to be written to target addressable register 160 from output buffer 120 of master device 20 to shift register 110 of master device 20 and clocks the data out of shift register 110 of master device 20 via clock 140. The clocking of shift register 110 of target slave device 30 received via clock bus 60, clocks out of shift register 110 of target slave device 30 the address of target slave device 30 previously received from MOSI bus 40, which appears on MISO bus 50 and is clocked into shift register 110 of master device 20. Preferably, master control 100 reads the address of target slave device 30 via output buffer 120, and preferably compares it with the address sent via compare functionality 180. In the event of a mismatch, a fault error is flagged, and the routine proceeds to an error handler.

The above has been described in an embodiment in which target slave device 30 acknowledges by leaving the address of target slave device 30 previously received from MOSI bus 40 in shift register 110 of target slave device 30, however this is not meant to be limiting in any way. In another embodiment, target slave device 30 acknowledges by loading the preset address of target slave device 30 into shift register 110 of target slave device 30 to be clocked out concomitantly with the transfer of data on MOSI bus 40.

Upon completion of the transfer of data from master device 20 to slave device 30, slave control circuitry 150 writes the received data to the target addressable register 160 responsive to the received address.

In the event of a read command, upon completion of the transfer of the address of target slave device 30 from master device 20 to slave device 30, slave control circuitry 150 has completed the retrieval of read data from addressable register 160 responsive to the initially address received and stored the read data on output buffer 120 of target slave device 30, and transfers the read data to shift register 110 of target slave device 30.

Master control 100 loads shift register 110 of master device 20 with dummy data via output buffer 120 and clocks the dummy data loaded out of shift register 110 of master device 20 via clock 140. The clocking of shift register 110 of target slave device 30 received via clock bus 60, clocks out of shift register 110 of target slave device 30 the read data retrieved from target addressable register 160, which appears on MISO bus 50 and is clocked into shift register 110 of master device 20.

After data transfer is complete, master control 100 sets enable bus 70 to inactive thus ending the frame.

Thus, in the second data transfer protocol embodiment, retrieval of data from target addressable register 160 begins prior to receipt of the address of target slave device 30 advantageously providing sufficient time to overcome any latency in the retrieval of data from target addressable register 160.

The above has been described in an embodiment in which addresses and data written are not acknowledged, however this is not meant to be limiting in any way.

In another embodiment, acknowledgement of one or more of the address of target addressable register 160, the address of target slave device 30 and data written are acknowledged as described above in relation to the first data transfer protocol embodiment. The above has been described in an embodiment in which each data transfer addresses a particular one of a plurality of slave devices 30, however this is not meant to be limiting in any way. In another embodiment a broadcast address is further defined. Data transfer to the defined broadcast address is not responded to by any of the slave device 30, who maintain their respective output buffer 170 in a disabled state. In one further embodiment, each of the slave devices 30 responds to the broadcast in an identical fashion. In one yet further embodiment, a write to each of the slave devices is stored and only acted upon responsive to receipt of a particular broadcast message, thereby enabling synchronization between disparate slave devices 30.

In a third data transfer protocol embodiment as will be described further hereinto below in relation to FIGS. 6A-7B, master control 100 addresses data to, or reads data from, a particular addressable register 160, denoted target addressable register 160, of a particular slave device 30, denoted target slave device 30, by first loading the address of target slave device 30 into output buffer 120 of master device 20 and transferring the address to shift register 110 of master device 20. Master control 100 then sets enable bus 70 to active and clocks the address out of shift register 110 of master device 20 via clock 140. The address appears on MOSI bus 40, and is clocked, by clock 140 appearing on clock bus 60, into shift register 110 of each slave device 30. In an exemplary embodiment, a single bit of the address further comprises a read or write bit. Output buffer 170 of each slave device 30 is initially in a high impedance state.

Slave control circuitry 150 of each slave device 30 reads the incoming address via respective input buffer 130, and compares it with a preset slave address via compare functionality 180. In one embodiment the preset slave address is set via resistor values as described in U.S. Pat. No. 5,646,609 to O'Brien issued Jul. 8, 1997, incorporated above. In another embodiment the preset slave address is downloaded from a host (not shown) as part of an initial configuration stage. In yet another embodiment the preset slave address is set by connections of selected pins of the slave device 30 to particular voltage values.

In the event that the incoming address of target slave device 30 matches the preset address of a particular slave device 30, i.e. the particular slave device is target slave device 30, target slave device 30 preferably loads its preset address into output buffer 120 of target slave device 30, transfers it to shift register 110 of target slave device 30 and enables the output of shift register 110 of target slave device 30 by enabling the respective output buffer 170.

Master control 100 then loads the address of the particular addressable register 160, denoted target addressable register 160, into output buffer 120, transfers the address to shift register 110 of master device 20 and clocks the address of target addressable register 160 out of shift register 110 of master device 20 via clock 140. The clocking of shift register 110 of target slave device 30 via clock bus 60, clocks out of shift register 110 of target slave device 30 the preset address loaded therein, which appears on MISO bus 50 and is clocked into shift register 110 of master device 20. Preferably, master control 100 reads the received preset address of the slave device 30, via input buffer 130 of master device 20, and preferably compares the received preset address, via compare functionality 180, with the transmitted target slave address. In the event of a mismatch, a fault error is flagged, and the routine proceeds to an error handler. Slave control circuitry 150, copies the received address of target addressable register 160 into input buffer 130.

Master control 100 then loads the length of data to be transferred into output buffer 120, transfers the length of data into shift register 110 of master device 20 and clocks the length of data out of shift register 110 of master device 20 via clock 140. The length of data transfer may be indicated in bits, bytes or words of a predetermined bit length without exceeding the scope of the invention. The clocking of shift register 110 of target slave device 30 via clock bus 60, clocks out of shift register 110 of target slave device 30 the address of target addressable register 160 received from master device 20, which appears on MISO bus 50 and is clocked into shift register 110 of master device 20. Preferably, master control 100 reads the echoed target addressable register 160 address received from target slave device 30, via input buffer 130 of master device 20, and preferably compares the echoed target addressable register 160 address with the transmitted target addressable register 160 address via compare functionality 180. In the event of a mismatch, a fault error is flagged, and the routine proceeds to an error handler. Slave control circuitry 150, copies the received length of data into input buffer 130.

In the event of a write command, upon completion of the transfer of the length of data transfer from master device 20 to slave device 30, and in particular to target slave device 30, master control 100 transfers data to be written to target addressable register 160 exhibiting the length of data transfer from output buffer 120 to shift register 110 of master device 20 and clocks the data out of shift register 110 of master device 20 via clock 140. The clocking of shift register 110 of target slave device 30, received via clock bus 60, clocks out of shift register 110 of target slave device 30 the length of data transfer previously received from MOSI bus 40, which appears on MISO bus 50 and is clocked into shift register 110 of master device 20. Preferably, master control 100 reads the length of data transfer echoed back via input buffer 130, and preferably compares it, via compare functionality 180, with the transmitted length of data transfer. In the event of a mismatch, a fault error is flagged, and the routine proceeds to an error handler.

Upon completion of the transfer of data from master device 20 to slave device 30, preferably upon completion of each byte, slave control circuitry 150 copies the received data from respective shift register 110 to respective input buffer 130.

Master control 100 loads shift register 110 of master device 20 with dummy data via respective output buffer 120 and clocks the dummy data loaded out of shift register 110 of master device 20 via clock 140. The clocking of shift register 110 of target slave device 30, received via clock bus 60, clocks out of shift register 110 of target slave device 30 the data previously received from master device 20 which appears on MISO bus 50 and is clocked into shift register 110 of master device 20. In the event that multi-byte data was transferred the last byte transferred appears on MOSI bus 50 concomitant with the dummy data.

Master control 100 reads the data received via input buffer 130, and compares it, via compare functionality 180, with the transmitted data. In the event the data matches, and no error flags have been raised, i.e. the address of target slave device 30, the address of the particular addressable register 160, and the bit length of the data transfer echoed back matches, a CRC is generated. Preferably, the CRC is calculated for the address of target slave device 30, the address of the particular addressable register 160, the length of data transfer and the transmitted data to be written. Preferably, the dummy data sent is not included in the CRC.

In the event the data does not match, or in the event of any error flag described above being set, an error is generated. In one embodiment, the error is a CRC incorporating an error generated for the address of target slave device 30, the address of target addressable register 160, the length of data transfer and the transmitted data to be written. Preferably, the dummy data sent is not included in the error. In another embodiment, the error is constituted of a predetermined error flag.

Master control 100 loads shift register 110 of master device 20 with the CRC, or error, respectively, via respective output buffer 120 and clocks the CRC, or error, respectively, out of shift register 110 of master device 20 via clock 140. The clocking of shift register 110 of target slave device 30, received via clock bus 60, clocks out of shift register 110 of target slave device 30 the dummy data previously received from master device 20 which appears on MISO bus 50 and is clocked into shift register 110 of master device 20.

Slave control circuitry 150 generates a CRC following the same rules as the CRC generated by the master. Preferably, the CRC is generated for the address of target slave device 30, the address of the particular addressable register 160, the bit length of the data transfer and the data to be written received from master device 20. Slave control circuitry 150 further reads the received CRC or error via input buffer 130. The generated CRC is compared to the received CRC or error. In the event that they match, the fidelity of the data is thus confirmed, and slave control circuitry 150 writes the received data responsive to the received target addressable register 160 address. In the event that they do not match, i.e. an error was received from master device 20, the lack of fidelity of the data is thus confirmed, and slave control circuitry 150 rejects the received data and does not write it to the received target addressable register 160 address.

In the event of a read command, upon completion of the transfer of the address of target addressable register 160 and the length of data transfer from master device 20 to slave device 30, and in particular to target slave device 30, slave control circuitry 150 retrieves the read data from addressable register 160 responsive to the received target addressable register 160 address and stores it in output buffer 120 of target slave device 30.

Master control 100 loads shift register 110 of master device 20 with dummy data via output buffer 120 and clocks the dummy data loaded out of shift register 110 of master device 20 via clock 140. The clocking of shift register 110 of target slave device 30 received via clock bus 60, clocks out of shift register 110 of target slave device 30 the length of data transfer previously received from MOSI bus 40, which appears on MISO bus 50 and is clocked into shift register 110 of master device 20. Preferably, master control 100 reads the echoed length of data transfer via input buffer 130, and preferably compares it, via compare functionality 180, with the transmitted length of data transfer. In the event of a mismatch, a fault error is flagged, and the routine proceeds to an error handler.

In the event that no error flags have been raised, i.e. the received preset slave address of target slave device 30, the echoed target addressable register 160 address, and the echoed length of data transfer matches those transmitted, a CRC is generated. Preferably, the CRC is generated for the address of target slave device 30, the address of target addressable register 160 and the length of data transfer. Preferably, the dummy data sent is not included in the CRC.

In the event that an error flag has been raised, i.e. at least one of the received preset address of target slave device 30, the echoed address of target addressable register 160, and the echoed length of data transfer does not match those transmitted, an error is generated. In one embodiment, the error is a CRC incorporating an error generated for the address of target slave device 30, the address of target addressable register 160 and the length of data transfer. Preferably, the dummy data sent is not included in the error. In another embodiment, the error is constituted of a predetermined error flag.

Master control 100 loads shift register 110 of master device 20 with the CRC, or error, respectively, via respective output buffer 120 and clocks the CRC or error loaded out of shift register 110 of master device 20 via clock 140. The clocking of shift register 110 of target slave device 30, received via clock bus 60, clocks out of shift register 110 of target slave device 30 the dummy data previously received from master device 20 which appears on MISO bus 50 and is clocked into shift register 110 of master device 20. Slave control circuitry 150 reads the received CRC or error via respective input buffer 130.

Slave control circuitry 150 generates a CRC following the same rules as the CRC generated by master device 20. Preferably, the CRC is generated for the received address of target slave device 30, the received address of target addressable register 160 and the received length of data transfer. The generated CRC is compared to the received CRC or error. In the event that they match, the fidelity of the addresses and length of data transfer is confirmed, and slave control circuitry 150 proceeds to retrieve the read data from target addressable register 160 responsive to the received address, store it in respective output buffer 120 and transfer it to shift register 110 as will be described further below. In the event that they do not match, i.e. an error was received from master device 20, the lack of fidelity of the data is confirmed, and slave control circuitry 150 rejects the received addressees and does not retrieve data from target addressable register 160.

Master control 100 loads shift register 110 of master device 20 with dummy data via respective output buffer 120 and clocks the dummy data loaded out of shift register 110 of master device 20 via clock 140. The clocking of shift register 110 of target slave device 30, received via clock bus 60, clocks out of shift register 110 of target slave device 30 the retrieved read data which appears on MISO bus 50 and is clocked into shift register 110 of master device 20.

Upon completion of the transfer of read data exhibiting the data length, preferably upon completion of each byte thereof, master control 100 copies the received data from respective shift register 100 to respective input buffer 130. Slave control circuitry 150 loads dummy data into respective output buffer 120 and transfers the dummy data into respective shift register 110. Master control 100 copies the last received read data byte into the respective input buffer 130, and echoes back the read data by clocking the received data out of shift register 110 of master device 20 via clock 140. The clocking of shift register 110 of target slave device 30, received via clock bus 60, clocks out of shift register 110 of target slave device 30 the dummy data which appears on MISO bus 50 and is clocked into shift register 110 of master device 20.

Slave control circuitry 150 reads the echoed read data received via input buffer 130, and compares it with the transmitted read data via compare functionality 180. In the event the data matches, a CRC of the transmitted data is generated. Preferably, the transmitted dummy data is not included in the CRC.

In the event the echoed read data does not match the transmitted read data, an error is generated. In one embodiment, the error is a CRC generated for the read data incorporating an error. Preferably, the transmitted dummy data is not included in the error. In another embodiment, the error is constituted of a predetermined error flag.

Slave control circuitry 150 loads respective shift register 110 with the CRC, or error, respectively, via respective output buffer 120. Master control 100 clocks the dummy data received from slave device 20 out of shift register 110 of master device 20 via clock 140. The clocking of shift register 110 of target slave device 30, received via clock bus 60, clocks out of shift register 110 of target slave device 30 the CRC or error which appears on MISO bus 50 and is clocked into shift register 110 of master device 20.

Master control 100 generates a CRC on the received data following the same rules as the CRC generated by slave control circuitry 150. The calculated CRC is compared to the received CRC or error. In the event that they match, the fidelity of the read data is thus confirmed, and master control 100 utilizes the read data. In the event that they do not match, i.e. an error was sent, the lack of fidelity of the data is thus confirmed, and master control 100 rejects the read data and calls an error handler.

After data transfer is complete, master control 100 sets enable bus 70 to inactive thus ending the frame.

Thus, in the third data transfer protocol embodiment, the transfer of data, whether composed of addresses, data to be written or data being read is echoed back and its fidelity confirmed by the transmitter of the data based on the echo. A CRC is generated and transmitted to confirm the fidelity to the receiver of the data. In the event of an error, an error is transmitted, preferably comprising a CRC with an error, to confirm the lack of fidelity to the receiver of the data.

The above has been described in an embodiment in which dummy data is transmitted, however this is not meant to be limiting in any way. In another embodiment non-critical data is transferred in place of the dummy data without exceeding the scope of the invention.

The above has been described in an embodiment in which each data transfer addresses a particular one of a plurality of slave devices 30, however this is not meant to be limiting in any way. In another embodiment a broadcast address is further defined. Data transfer to the defined broadcast address is not responded to by any of the slave device 30, who maintain their respective output buffer 170 in a disabled state. In one further embodiment, each of the slave devices 30 responds to the broadcast in an identical fashion. In one yet further embodiment, a write to each of the slave devices is stored and only acted upon responsive to receipt of a particular broadcast message, thereby enabling synchronization between disparate slave devices 30.

Figure 2A:
FIG. 2A is a high-level block diagram of a write embodiment of a first data transfer protocol according to the principal of the invention, in which the target slave address is advantageously returned to the master as an acknowledge and error detection signal.

FIG. 2A is a high-level block diagram of a write embodiment of a first data transfer protocol according to the principal of the invention, in which the target slave address is advantageously returned to the master as an acknowledge and error detection signal. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The second byte, or bytes, transmitted on MOSI bus 40 comprises the address of target addressable register 160. Concomitantly on MISO bus 50, the preset address of the responding slave device 30 appears as an acknowledgement and for error detection.

The third byte, or bytes, transmitted on MOSI bus 40 comprises the data to be written to target addressable register 160 of target slave device 30. Concomitantly on MISO bus 50, the address of target addressable register 160 received appears as an acknowledgement and for error detection. It is it be understood that the third byte may comprise a plurality of bytes without exceeding the scope of the invention. Each byte sent is echoed back in accordance with a principle of the invention.

The fourth byte, or bytes, transmitted on MOSI bus 40 comprises dummy data, and is used to clock out the last byte of previously sent data. Concomitantly on MISO bus 50, the received data to be written to target addressable register 160 appears as an acknowledgement and for error detection.

Figure 2B:
FIG. 2B is a high-level block diagram of a read embodiment of a first data transfer protocol according to the principal of the invention, in which the target slave address is advantageously returned to the master as an acknowledge and error detection signal.

FIG. 2B is a high-level block diagram of a read embodiment of a first data transfer protocol according to the principal of the invention, in which the target slave address is advantageously returned to the master as an acknowledge signal. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The second byte, or bytes, transmitted on MOSI bus 40 comprises the address of target addressable register 160. Concomitantly on MISO bus 50, the preset address of the responding slave device 30 appears as an acknowledgement and for error detection.

The third byte, or bytes, transmitted on MOSI bus 40 comprises dummy data, and is used to clock out the target addressable register 160 address previously transmitted. Thus, concomitantly on MISO bus 50, the address of target addressable register 160 received appears as an acknowledgement and for error detection.

The fourth byte, or bytes, transmitted on MOSI bus 40 comprises dummy data, and is used to clock out the data retrieved. Concomitantly on MISO bus 50, the data retrieved from target addressable register 160 appears. It is it be understood that the fourth byte may comprise a plurality of bytes without exceeding the scope of the invention.

Figure 3A:
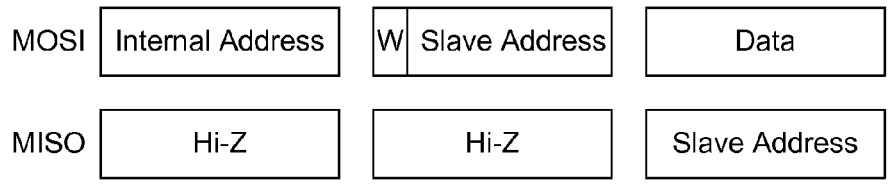
FIG. 3A is a high-level block diagram of a write embodiment of a second data transfer protocol according to the principal of the invention, in which the target addressable register address precedes the target slave address.

FIG. 3A is a high-level block diagram of a write embodiment of a second data transfer protocol according to the principal of the invention, in which the internal register address precedes the target slave address. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target addressable register 160. Concomitantly on MISO bus 50, all output buffers 70 are in a high impedance state, and thus no data is transferred.

The second byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The third byte, or bytes, transmitted on MOSI bus 40 comprises the data to be written at target addressable register 160 of target slave device 30. Concomitantly on MISO bus 50, the received address of the responding slave device 30 appears as an acknowledgement and for error detection. In another embodiment the preset address of the responding slave device 30 appears as an acknowledgement and for error detection. It is it be understood that the third byte may comprise a plurality of bytes without exceeding the scope of the invention. In such an embodiment, preferably some data bytes are echoed to master device 20.

In one embodiment of FIGS. 2A, 2B concomitant data is simultaneously clocked out on both MOSI bus 40 and MISO bus 50. In another embodiment concomitant data to MOSI bus 40 and MISO bus 50 are clocked on opposing clock edges appearing on clock bus 60.

Figure 3B:
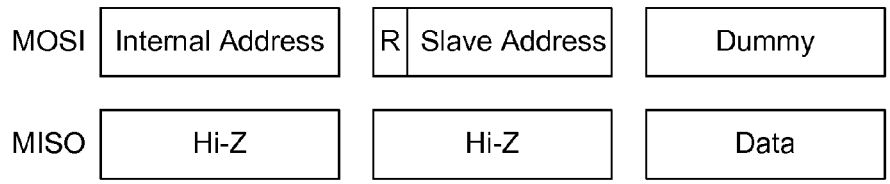
FIG. 3B is a high-level block diagram of a read embodiment of a second data transfer protocol according to the principal of the invention, in which the target addressable register address precedes the target slave address.

FIG. 3B is a high-level block diagram of a read embodiment of a second data transfer protocol according to the principal of the invention, in which the internal register address precedes the target slave address. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target addressable register 160. Concomitantly on MISO bus 50, all output buffers 70 are in a high impedance state, and thus no data is transferred.

The second byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The third byte, or bytes, transmitted on MOSI bus 40 comprises dummy data, and is used to clock out the retrieved data. The third byte sent concomitantly on MISO bus 50 comprises the data read from target addressable register 160 of target slave device 30. It is it be understood that the third byte may comprise a plurality of bytes without exceeding the scope of the invention. In such an embodiment, preferably some data bytes are echoed to master device 20.

In one embodiment of FIGS. 3A, 3B concomitant data is simultaneously clocked out on both MOSI bus 40 and MISO bus 50. In another embodiment concomitant data to MOSI bus 40 and MISO bus 50 are clocked on opposing clock edges appearing on clock bus 60.

Figure 4:
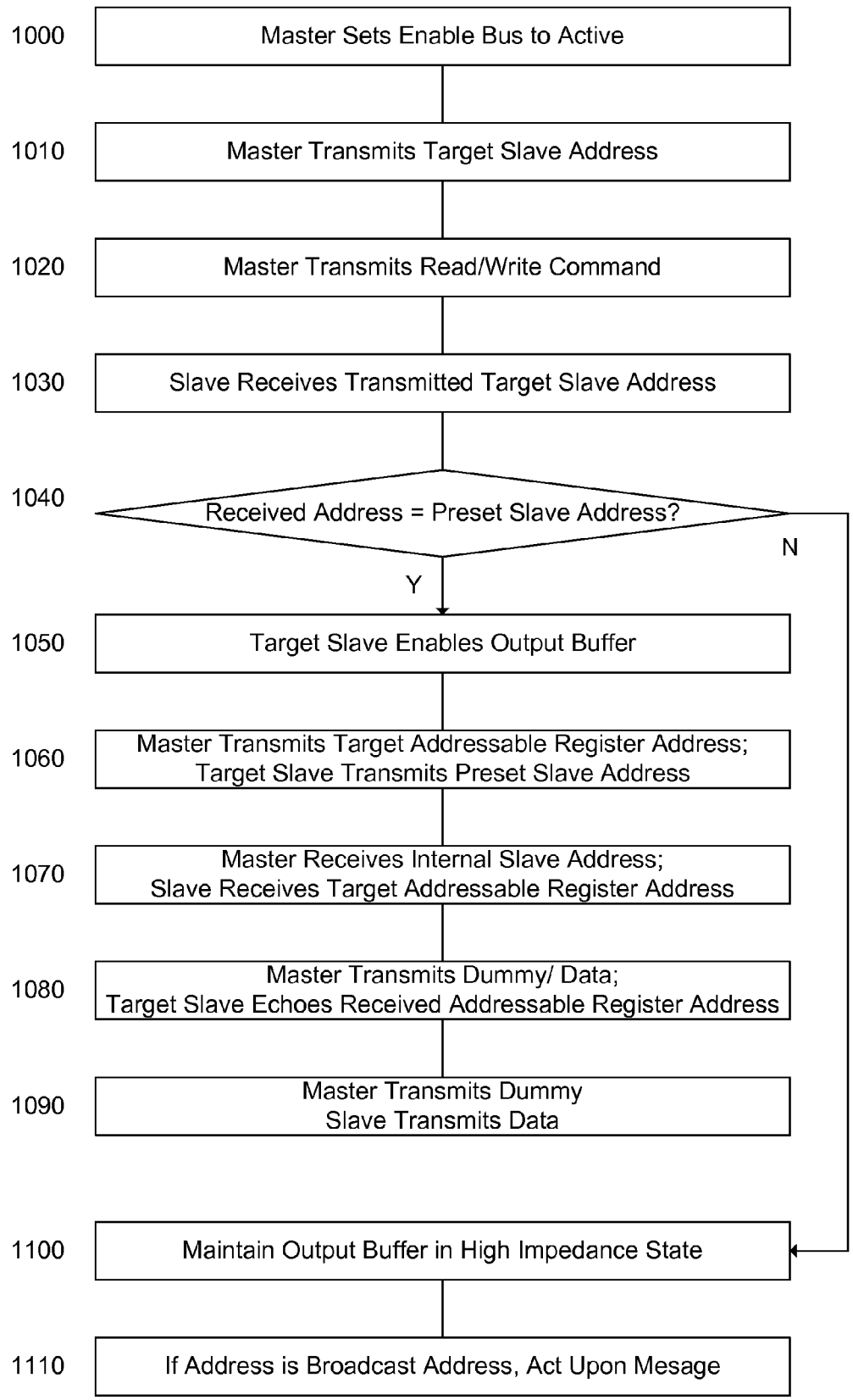
FIG. 4 is a high-level flow chart of the operation of the system of FIG. 1 in accordance with the first data transfer protocol of FIGS. 2A, 2B.

FIG. 4 is a high-level flow chart of the operation of the system of FIG. 1 in accordance with the first data transfer protocol of FIGS. 2A, 2B. In stage 1000, master device 20 sets enable bus 70 to active. Enable bus 70 is connected to each slave device 30. In stage 1010, master device 20 transmits the address of the target slave device 30. In stage 1020, master device 20 transmits one of a read and a write command. In an exemplary embodiment, a single bit of the address of stage 1010 comprises a bit set alternatively to read or write. In stage 1030, all slave device 30 receive the transmitted address of stage 1010.

In stage 1040, the received address of stage 1030 is compared with a preset slave address. In the event that the received address is not equal to the preset slave address, in stage 1100, output buffer 170 is maintained in a high impedance state. In the event that the address is stored as the address associated with a broadcast message, the broadcast message is acted upon as described above. In the event that the received address is equal to the preset slave address, i.e. the slave device 30 is the target slave device 30, in stage 1050 target slave device 30 enables the associated output buffer 170.

In stage 1060, target slave device 30 loads its preset slave address into the respective shift register 110. Master device 20 transmits the address of the target addressable register 160, and concomitantly, target slave device 30 transmits its preset slave address to master device 20. In stage 1070, master device 20 receives the transmitted preset slave address of stage 1060 as an acknowledgement and for error detection and target slave device 20 receives the transmitted address of the target addressable register 160 of stage 1060. In a preferred embodiment, master device 20 compares the received preset slave address of stage 1060 with the transmitted target slave address of stage 1010. In the event that the addresses do not match, an error routine (not shown) is preferably called.

In stage 1080, master device 20 transmits one of data to be written and dummy data. In particular, in the event that the read/write command of stage 1020 is a write command, data to be written is transmitted in stage 1080 by master device 20, and in the event that the read/write command of stage 1020 is a read command, dummy data is transmitted in stage 1080 by master device 20. Concomitantly, target slave device 30 echoes the received address of the target addressable register 160 of stage 1070 as an acknowledgement and for error detection. In a preferred embodiment, master device 20 compares the received echoed target addressable register 160 of stage 1080 with the transmitted target addressable register 160 of stage 1060. In the event that the addresses do not match, an error routine (not shown) is preferably called.

In stage 1090, master device 20 transmits dummy data. Concomitantly, target slave device 30 transmits one of received data to be written and data read from target addressable register 160. In particular, in the event that the read/write command of stage 1020 is a write command, data to be written received in stage 1080 is transmitted to master device 20 as an acknowledgement and for error detection, and in the event that the read/write command of stage 1020 is a read command, data retrieved from target addressable register 160 is transmitted to master device 20. In a preferred embodiment, in the event of a write command master device 20 compares the echoed data to be written of stage 1090 with the data transmitted in stage 1080. In the event that the data does not match, an error routine (not shown) is preferably called.

Thus, the method of FIG. 4 provides for acknowledgement and error detection of both the target slave device 30 address and the target addressable register 160. Data being written to a target addressable register 160 is further acknowledged.

Figure 5:
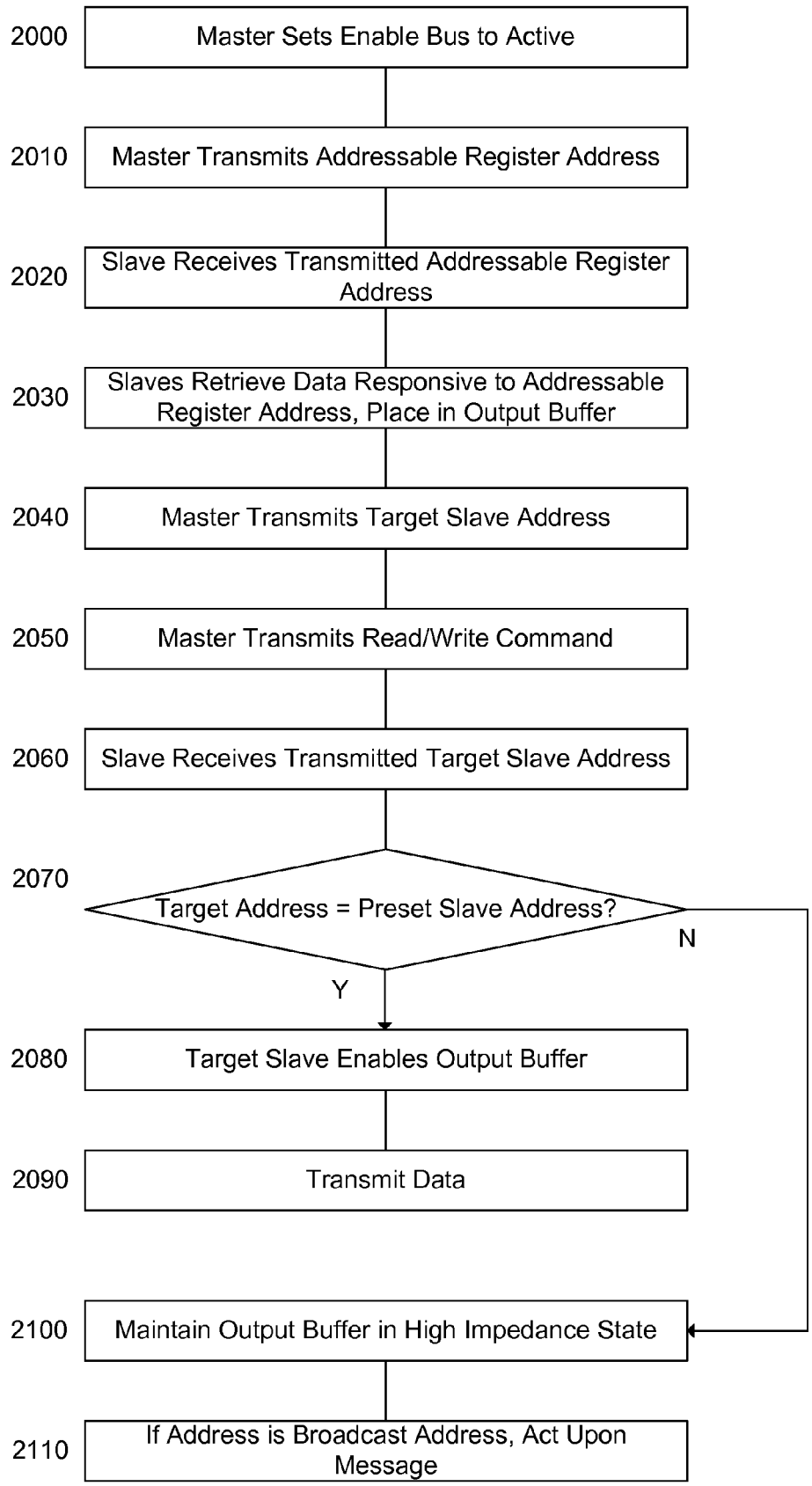
FIG. 5 is a high-level flow chart of the operation of the system of FIG. 1 in accordance with the second data transfer protocol of FIGS. 3A, 3B.

FIG. 5 is a high-level flow chart of the operation of the system of FIG. 1 in accordance with the second data transfer protocol of FIGS. 3A, 3B. In stage 2000, master device 20 sets enable bus 70 to active. Enable bus 70 is connected to each slave device 30. In stage 2010, master device 20 transmits the address of the target addressable register 160. In stage 2020, all slave device 30 receive the transmitted address of the target addressable register 160 of stage 2010.

In stage 2030, all slave devices 30 begin to retrieve data from the address of the target addressable register 160 whose address is common among slave devices 30. It is to be understood that only one of the slave devices 30 is the target slave device 30. Retrieved data is placed in output buffer 120 of the respective slave device 30. Preferably, each addressable register 160 of each slave device 30 is not set to erase on read, since in the second data transfer protocol an addressable register 160 of the slave device 30 not being the target is read, and the data will be lost.

In stage 2040, master device 20 transmits the address of target slave device 30. In stage 2050, master device 20 transmits one of a read and a write command. In an exemplary embodiment, a single bit of the address of stage 2040 further comprises a bit set alternatively to read or write. In stage 2060, all slave devices 30 receive the transmitted target slave address of stage 2040.

In stage 2070, the received address of stage 2060 is compared with a preset slave address. In the event that the received address is not equal to the preset slave address, in stage 2100, output buffer 170 is maintained in a high impedance state. In the event that the address is stored as the address associated with a broadcast message, the broadcast message is acted upon as described above. In the event that the received address is equal to the preset slave address, i.e. the slave device 30 is target slave device 30, in stage 2080 target slave device 30 enables the associated output buffer 170.

In stage 2090, in the event of a read command transmitted in stage 2050, target slave device 30 transfers the retrieved data read from target addressable register 160 and placed in output buffer 120 to the respective shift register 110 and, concomitantly with received dummy data from master device 20, transmits the retrieved data to master device 30. In the event of a write command transmitted in stage 2050, in stage 2090 master device 20 transmits the data to be written to target addressable register 160 to slave device 30.

The method of FIG. 5 advantageously provides for retrieval of data from target addressable register 160 prior to receipt of the address of target slave device 30 advantageously providing sufficient time to overcome any latency in the retrieval of data from target addressable register 160.

Figure 6A:
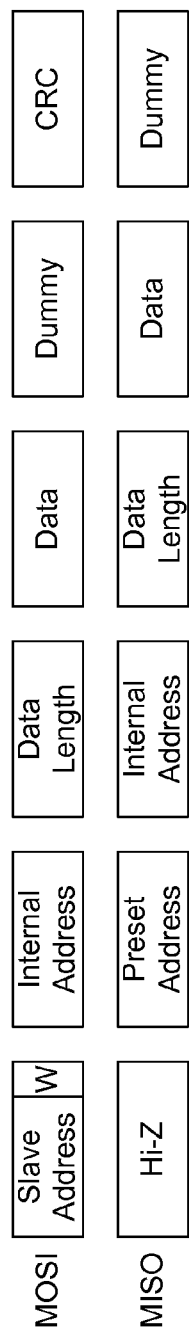
FIG. 6A is a high-level block diagram of a write embodiment of a third data transfer protocol according to the principal of the invention, in which the fidelity of data transfer is confirmed by the transmitter to the receiver.

FIG. 6A is a high-level block diagram of a write embodiment of a third data transfer protocol according to the principal of the invention, in which the fidelity of data transfer is confirmed by the transmitter to the receiver. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The second byte, or bytes, transmitted on MOSI bus 40 comprises the address of target addressable register 160. Concomitantly on MISO bus 50, the preset address of the responding slave device 30 appears as an acknowledgement and for error detection.

The third byte, or bytes, transmitted on MOSI bus 40 comprises the length of data to be written at target addressable register 160 of target slave device 30. Concomitantly on MISO bus 50, the address of target addressable register 160 received appears as an acknowledgement and for error detection.

The fourth byte, or bytes, transmitted on MOSI bus 40 comprises the data to be written at target addressable register 160 of target slave device 30. Concomitantly on MISO bus 50, the received length of data to be written appears as an acknowledgement and for error detection. It is it be understood that the fourth byte may comprise a plurality of bytes, consonant with the length of data to be written, without exceeding the scope of the invention. Each byte of data is echoed back in accordance with a principle of the invention.

The fifth byte, or bytes, transmitted on MOSI bus 40 comprises dummy data, and is used to clock out the echo of the last byte of previously sent data. Concomitantly on MISO bus 50, the data to be written to target addressable register 160 appears as an acknowledgement and for error detection.

The sixth byte, or bytes, transmitted on MOSI bus 40 comprises a CRC or error generated responsive to echoed back data. In a preferred embodiment the CRC or error is generated for the received preset address of the responding slave device 30, the echoed address of target addressable register 160, the echoed length of data to be written and the echoed data to be written. Concomitantly on MISO bus 50, the dummy data of the sixth byte appears as an acknowledgement and for optional error detection.

Figure 6B:
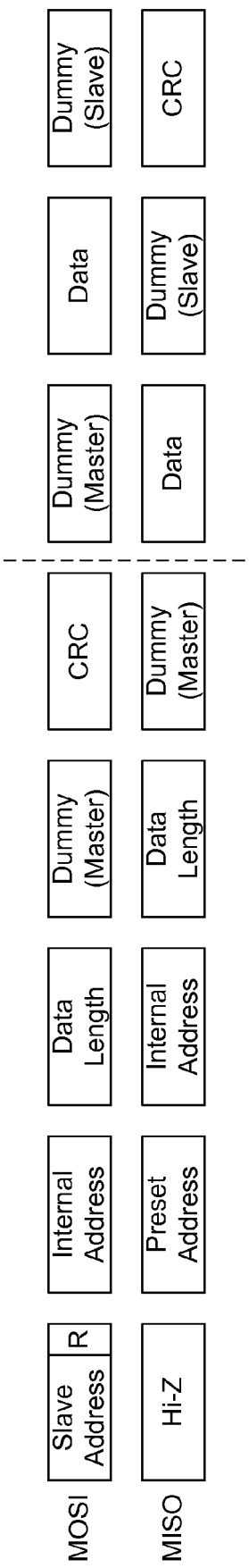
FIG. 6B is a high-level block diagram of a read embodiment of a third data transfer protocol according to the principal of the invention, in which the fidelity of data transfer is confirmed by the transmitter of the read data to the receiver.

FIG. 6B is a high-level block diagram of a read embodiment of a third data transfer protocol according to the principal of the invention, in which the fidelity of data transfer is confirmed by the transmitter of the read data to the receiver. Bytes transferred proceed from left to right; the left byte is transferred before the byte appearing to its immediate right. Data appearing on MOSI bus 40 is shown above and data appearing concomitantly on MISO bus 50 is shown below.

The first byte, or bytes, transmitted on MOSI bus 40 comprises the address of target slave device 30. Preferably, at least one bit further comprises read/write information. Concomitantly on MISO bus 50, all output buffers 70 are in a high impedance state, and thus no data is transferred.

The second byte, or bytes, transmitted on MOSI bus 40 comprises the address of target addressable register 160. Concomitantly on MISO bus 50, the preset address of the responding slave device 30 appears as an acknowledgement and for error detection.

The third byte, or bytes, transmitted on MOSI bus 40 comprises the length of data to be written at target addressable register 160 of target slave device 30. Concomitantly on MISO bus 50, the address of target addressable register 160 received appears as an acknowledgement and for error detection.

The fourth byte, or bytes, transmitted on MOSI bus 40 comprises dummy data from the master, and is used to clock out the previously sent length of data to be written. Thus, concomitantly on MISO bus 50, the received length of data to be written received appears as an acknowledgement and for error detection.

The fifth byte, or bytes, transmitted on MOSI bus 40 comprises a CRC or error generated for the received preset address of the responding slave device 30, the echoed address of target addressable register 160 and the echoed length of data to be written. Concomitantly on MISO bus 50, the dummy data previously transmitted from master device 20 appears.

A dashed line appears after the fifth byte indicating that the data to be read has been retrieved and is now being sent.

The sixth byte, or bytes, transmitted on MOSI bus 40 comprises dummy data from the master, and is used to clock out the read data. Concomitantly on MISO bus 50, the read data appears.

The seventh byte, or bytes, transmitted on MOSI bus 40 comprises an echo of the data received in the sixth byte, or bytes, from the slave. Concomitantly on MISO bus 50, dummy data from the responding slave device 30 appears.

The eight byte, or bytes, transmitted on MOSI bus 40 comprises an echo of the dummy data transmitted by slave device 30 in the seventh byte, or bytes. Concomitantly on MISO bus 50, a CRC or error of the read data appears.

Figure 7A:
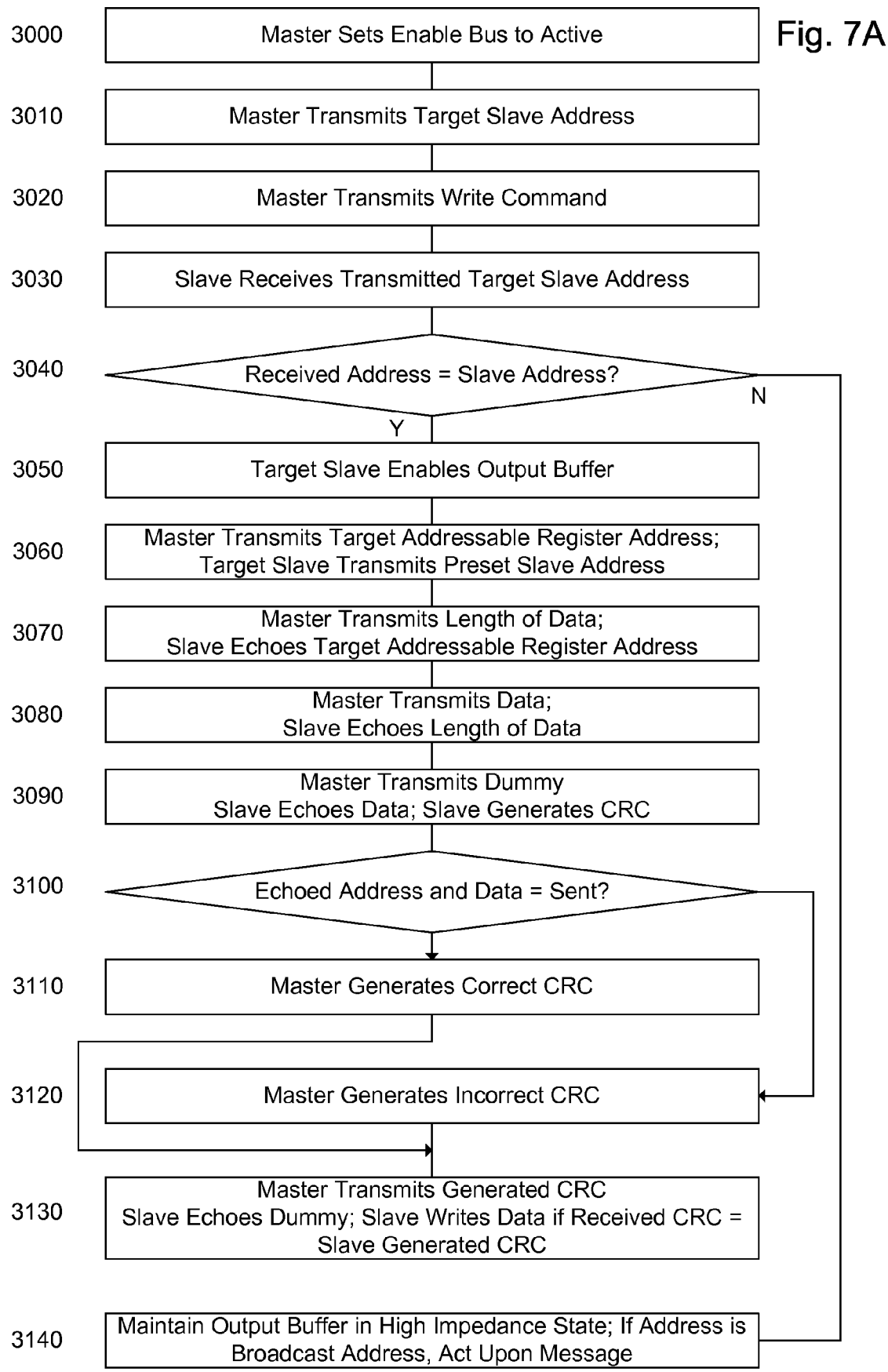
FIG. 7A is a high-level flow chart of the operation of the system of FIG. 1 in accordance with the write embodiment of the third data transfer protocol of FIG. 6A.

FIG. 7A is a high-level flow chart of the operation of the system of FIG. 1 in accordance with the write embodiment of the third data transfer protocol of FIG. 6A. In stage 3000, master device 20 sets enable bus 70 to active. Enable bus 70 is connected to each slave device 30. In stage 3010, master device 20 transmits the address of the target slave device 30. In stage 3020, master device 20 transmits a write command. In an exemplary embodiment, a single bit of the address of stage 3010 comprises a bit set alternatively to read or write. In stage 3030, all slave devices 30 receive the transmitted address of stage 3010.

In stage 3040, the received address of stage 3030 is compared with a preset slave address of each slave device 30. In the event that the received address is not equal to the preset slave address, in stage 3140, output buffer 170 of the respective slave device 30 is maintained in a high impedance state. In the event that the address is stored as the address associated with a broadcast message, the broadcast message is acted upon as described above. In the event that the received address is equal to the preset slave address, i.e. the respective slave device 30 is the target slave device 30, in stage 3050 target slave device 30 enables the associated output buffer 170.

In stage 3060, target slave device 30 loads its preset slave address into the respective shift register 110. Master device 20 transmits the address of the target addressable register 160 to target slave device 30, and concomitantly, target slave device 30 transmits its preset slave address to master device 20. In a preferred embodiment, master device 20 compares the received transmitted preset slave address of stage 3060 with the transmitted target slave address of stage 3010. In the event that the addresses do not match, an error routine (not shown) is preferably called and an error flag is set.

In stage 3070, master device 20 transmits to target slave device 30 the length of data to be written, and concomitantly, target slave device 30 echoes the received address of the target addressable register 160 of stage 3060 to master device 20. In a preferred embodiment, master device 20 compares the received echoed address of the target addressable register 160 with the transmitted address of the target addressable register 160 of stage 3060. In the event that the addresses do not match, an error routine (not shown) is preferably called and an error flag is set.

In stage 3080, master device 20 transmits to target slave device 30 data to be written to target addressable register 160. Concomitantly, target slave device 30 echoes the received length of data to be written of stage 3070. In a preferred embodiment, master device 20 compares the received echoed length of data to be written with the transmitted length of data to be written of stage 3070. In the event that the lengths do not match, an error routine (not shown) is preferably called and an error flag is set.

In stage 3090, master device 20 transmits to target slave device 30 dummy data. Concomitantly, target slave device 30 echoes the received data to be written to target addressable register 160 of stage 3080. It is to be understood that in the event the data to be written to target addressable register 160 of stage 3080 is greater than a single byte, the dummy data of stage 3090 follows the last byte of transmitted data and concomitantly the last byte of data to be written to target addressable register 160 is echoed back to master device 20. Slave device 30 does not write the data, but instead generates a CRC on the received data. In a preferred embodiment the CRC is generated on the received target slave address of stage 3030, the received address of target addressable register 160 of stage 3060, the received length of data to be written of stage 3070 and the data to be written of stage 3080.

In stage 3100, master device 20 compares the data echoed back of stage 3090 with the transmitted data of stage 3080. In the event that the data matches, and no error flags were set as described above in relation to stage 3060, 3070 and 3080, in stage 3110 a CRC is generated for the transmitted data. In a preferred embodiment the CRC is generated for the transmitted target slave address of stage 3010, the transmitted address of target addressable register 160 of stage 3060, the transmitted length of data to be written of stage 3070 and the data to be written of stage 3080. In stage 3130, master device 20 transmits to target slave device 30 the generated CRC of stage 3110. Concomitantly, target slave device 30 echoes the received dummy data of stage 3090. Slave device 30, compares the received CRC with the CRC generated on the received data as described above in relation to stage 3090, and in the event the received CRC matches the generated CRC, writes the received data to be written of stage 3080 to target addressable register 160 of stage 3060.

In the event that in stage 3100 the data does not match, and/or one or more error flags were set as described above in relation to stage 3060, 3070 and 3080, in stage 3120 an incorrect CRC is generated for the transmitted data. In a preferred embodiment the incorrect CRC is generated for the transmitted target slave address of stage 3010, the transmitted address of target addressable register 160 of stage 3060, the transmitted length of data to be written of stage 3070 and the data to be written of stage 3080. In stage 3130, master device 20 transmits to target slave device 30 the generated incorrect CRC of stage 3110. Concomitantly, target slave device 30 echoes the received dummy data of stage 3090. Slave device 30, compares the received incorrect CRC with the CRC generated on the received data as described above in relation to stage 3090, and as a result of the incorrect CRC generated in stage 3120 does not write the received data to be written of stage 3080 to target addressable register 160 of stage 3060.

The above has been described in an embodiment in which an incorrect CRC is generated in stage 3120, however this is not meant to be limiting in any way. In another embodiment, a predetermined error flag is generated and transmitted in place of the incorrect CRC without exceeding the scope of the invention.

Thus, the method of FIG. 7A checks the fidelity or the lack of fidelity of the echoed data, and feeds forward the results of the fidelity check to the receiver, i.e. the target slave device 30. In the event of a lack of fidelity of the echoed data, preferably comprising addresses and data to be written, an error is transmitted from master device 20 to slave device 30 indicative that data is to be discarded due to a lack of fidelity of the communication link.

FIG. 7B is a high-level flow chart of the operation of the system of FIG. 1 in accordance with the read embodiment of the third data transfer protocol of FIG. 6B. In stage 4000, master device 20 sets enable bus 70 to active. Enable bus 70 is connected to each slave device 30. In stage 4010, master device 20 transmits the address of target slave device 30. In stage 4020, master device 20 transmits a read command. In an exemplary embodiment, a single bit of the address of stage 4010 comprises a bit set alternatively to read or write. In stage 4030, all slave devices 30 receive the transmitted address of stage 4010.

In stage 4040, the received address of stage 4030 is compared with a preset slave address of each slave device 30. In the event that the received address is not equal to the preset slave address, in stage 4190, output buffer 170 of the respective slave device 30 is maintained in a high impedance state. In the event that the address is stored as the address associated with a broadcast message, the broadcast message is acted upon as described above. In the event that the received address is equal to the preset slave address, i.e. the respective slave device 30 is the target slave device 30, in stage 4050 target slave device 30 enables the associated output buffer 170.

In stage 4060, target slave device 30 loads its preset slave address into the respective shift register 110. Master device 20 transmits the address of target addressable register 160 to target slave device 30, and concomitantly, target slave device 30 transmits its preset slave address to master device 20. In a preferred embodiment, master device 20 compares the received transmitted preset slave address of stage 4060 with the transmitted target slave address of stage 4010. In the event that the addresses do not match, an error routine (not shown) is preferably called and an error flag is set.

In stage 4070, master device 20 transmits to target slave device 30 the length of data to be read, and concomitantly, target slave device 30 echoes the received address of target addressable register 160 of stage 4060 to master device 20. In a preferred embodiment, master device 20 compares the received echoed address of target addressable register 160 with the transmitted address of target addressable register 160 of stage 4060. In the event that the addresses do not match, an error routine (not shown) is preferably called and an error flag is set.

In stage 4080, master device 20 transmits to target slave device 30 dummy data so as to echo out of slave device 30 the length of data to be read of stage 4070. Concomitantly, target slave device 30 echoes the received length of data to be read of stage 4070. Slave device 30 generates a CRC for the received data. In a preferred embodiment the CRC is generated for the data comprising: received target slave address of stage 4030; received address of target addressable register 160 of stage 4060; and received length of data to be read of stage 4070.

In stage 4090, master device 20 compares the echoed back length of data to be read of stage 4080 with the transmitted length of data to be read of stage 4070. In the event that the length of data to be read matches, and no error flags were set as described above in relation to stage 4060 and 4070, in stage 4100 a CRC is generated on the transmitted data. In a preferred embodiment the CRC is generated on the transmitted target slave address of stage 4010, the transmitted address of target addressable register 160 of stage 4060 and the transmitted length of data to be read of stage 4070. In stage 4120, master device 20 transmits to target slave device 30 the generated CRC of stage 4100. Concomitantly, target slave device 30 echoes the received dummy data of stage 4080. Slave device 30, compares the received CRC with the CRC generated for the received data as described above in relation to stage 4080, and in the event the received CRC matched the generated CRC, slave device 30 proceeds to retrieve data from target addressable register 160 of stage 4060 responsive to the received length of data to be read of stage 4070. Advantageously, the fidelity of the communication link is thus confirmed prior to retrieving data. In the event that a register is set to erase on read, such an error detection mechanism prevents erasing a register due to a lack of fidelity in communication.

In the event that in stage 4090 the data does not match, and/or one or more error flags were set as described above in relation to stage 4060 and 4070, in stage 4110 an incorrect CRC is generated on the transmitted data. In a preferred embodiment the incorrect CRC is generated on the transmitted target slave address of stage 4010, the transmitted address of target addressable register 160 of stage 4060 and the transmitted length of data to be read of stage 4070. In stage 4120, master device 20 transmits to target slave device 30 the generated incorrect CRC of stage 4100. Concomitantly, target slave device 30 echoes the received dummy data of stage 4080. Slave device 30, compares the received incorrect CRC with the CRC generated on the received data as described above in relation to stage 4080, and as a result of the incorrect CRC generated in stage 4110 does not retrieve data from target addressable register 160 of stage 4060 responsive to the received length of data to read of stage 4070.

Stages 4130-4180 to be described below are related to the transmittal of read data from the target slave device 30 of stage 4010, and are therefore separated by a dashed line indicative thereof.

In stage 4130, master device 20 transmits to target slave device 30 dummy data so as to echo out of slave device 30 the retrieved read data of stage 4120. Concomitantly, target slave device 30 transmits the retrieved read data to master device 20.

In stage 4140, master device 20 echoes to target slave device 30 the received read data of stage 4130. Concomitantly, target slave device 30 transmits dummy data to master device 20. Master device 20 generates a CRC on the received read data of stage 4130.

It is to be understood that in the event the data to be read from target addressable register 160 of stage 4060 is greater than a single byte, the dummy data of stage 4140 follows the last byte of transmitted read data and concomitantly the last byte of received read data is echoed back from master device 20 to slave device 30.

In stage 4150, slave device 30 compares the echoed back read data of stage 4140 with the transmitted read data of stage 4130. In the event that the read data matches, in stage 4160 slave device 30 generates a CRC for the transmitted read data of stage 4130.

In stage 4180, master device 20 transmits to target slave device 30 dummy data. Concomitantly, target slave device 30 transmits the generated CRC of stage 4160.

Master device 20, compares the received CRC with the CRC generated on the received data as described above in relation to stage 4140, and in the event the received CRC matches the generated CRC, master device 20 accepts the received read data of stage 4130. Advantageously, the fidelity of the communication link is thus confirmed prior to accepting the read data.

In the event that in stage 4150 the data does not match, in stage 4170 slave device 30 generate an incorrect CRC on the transmitted read data. In stage 4180, as described above, master device 20 transmits to target slave device 30 dummy data. Concomitantly, target slave device 30 transmits the generated incorrect CRC of stage 4150. Master device 20, compares the received incorrect CRC with the CRC generated on the received data as described above in relation to stage 4140, and as a result of the incorrect CRC generated in stage 4170 does not accept the read data.

The above has been described in an embodiment in which an incorrect CRC is generated in each of stages 4110, 4170 however this is not meant to be limiting in any way. In another embodiment, a predetermined error flag is generated and transmitted in place of the one or both of the incorrect CRCs without exceeding the scope of the invention.

Thus, the method of FIG. 7B confirms the fidelity or the lack of fidelity of the echoed data, and feeds forward the results of the fidelity check to the receiver, i.e. the target slave device 30 for addresses and length of data and master device 20 for read data. In the event of a lack of fidelity of the echoed data, an error is transmitted from transmitter to the receiver indicative that data is to be discarded due to a lack of fidelity of the communication link.

Thus the present embodiments enable an addressable SPI bus and an associated communication protocol. The addressable SPI bus comprises a plurality of slaves each exhibiting a particular address and a shift register whose output is connected to a common MISO bus by a buffer exhibiting a three state output, also known as a tri-state output. The master asserts a single SS line, which is connected in parallel to each of the plurality of slaves, indicating the beginning of a frame, and transmits via the MOSI bus the address of a particular slave of the plurality of slaves, denoted the target slave. Responsive to the received address, the target slave enables the three state output associated therewith thus transmitting the output of the target slave shift register to the master via the MISO bus.

In one embodiment, the target slave outputs the particular slave address as an acknowledge and error detection signal. In another embodiment, the transmitted data and/or addresses are echoed back to the data source, and the echoed data and/or addresses are compared with the sent data and/or addresses. In the event that the echoed back data and/or addresses match the transmitted data and/or addresses, a CRC is generated and transmitted to confirm data accuracy. In the event that the echoed back data and/or addresses does match the transmitted data and/or addresses, an incorrect CRC is generated and transmitted to confirm that data should be discarded.

In another embodiment, the master first outputs the address of the target addressable register for which data is to be read or written, and subsequently outputs the address of the target slave. Each slave, responsive to the received target addressable register address, retrieves data from the addressable register corresponding to the received target addressable register address. Each slave receives the subsequently output target slave address, and compares the target slave address with its particular address. The target slave enables the three state output associated therewith and transmits the retrieved data to the master via the MISO bus with reduced latency.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. No admission is made that any reference constitutes prior art. The discussion of the reference states what their author's assert, and the applicants reserve the right to challenge the accuracy and pertinency of the cited documents. It will be clearly understood that, although a number of prior art complications are referred to herein, this reference does not constitute an admission that any of these documents forms part of the common general knowledge in the art in any country.

In case of conflict, the patent specification, including definitions, will prevail. In addition, the materials, methods, and examples are illustrative only and not intended to be limiting.

In the claims of this application and in the description of the invention, except where the context requires otherwise due to express language or necessary implication, the word "comprise" or variations such as "comprises" or "comprising" is used in any inclusive sense, i.e. to specify the presence of the stated features but not to preclude the presence or addition of further features in various embodiments of the invention.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description.

We claim:

1. An addressable serial peripheral interface bus arrangement comprising:
   a master;
   a plurality of slaves, each of said slaves having associated therewith a particular slave address;
   a first and a second communication link connecting said master to each of said plurality of slaves, said first communication link different than said second communication link, each of said communication links constituted of a single wire link connected to a single port of said master and in parallel to each of said plurality of slaves;
   a clock, associated with said master and connected to each of said plurality of slaves, operative to clock data transmitted via said first communication link out of said master and into each of said plurality of slaves; and an enable control line, responsive to said master, and connected to each of said plurality of slaves in parallel, wherein said master is operative to transmit via said first communication link, responsive to said enable control line exhibiting an active signal, a target address, and wherein each of said plurality of slaves is operative to:
receive, from said master, via said first communication link said target address;
compare said received target address with said associated particular slave address; and
transmit, only in the event said received target address is consonant with said associated particular slave address, first data via said second communication link responsive to said enable control line exhibiting said active signal and responsive to said clock, said transmitting slave being denoted the responding slave.

2. An addressable serial peripheral interface bus arrangement according to claim 1, wherein each of said plurality of slaves is further operative in the event that said received target address is not consonant with said associated particular slave address, to maintain a high impedance towards said second communication link.

3. An addressable serial peripheral interface bus arrangement according to claim 1, wherein each of said plurality of slaves comprises a comparing functionality, said comparing of said received target address to said associated particular slave address being responsive to said comparing functionality.

4. An addressable serial peripheral interface bus arrangement according to claim 1, wherein said clock is further operative to clock said first data transmitted by said responding slave.

5. An addressable serial peripheral interface bus arrangement according to claim 1, wherein said target address is a broadcast address, for which no slave of said plurality of slaves is said responding slave.

6. An addressable serial peripheral interface bus arrangement according to claim 4, wherein said first data comprises said particular slave address of said responding slave.

7. An addressable serial peripheral interface bus arrangement according to claim 6, wherein said master is operative to transmit a target register address via said first communication link concomitantly with said first data transmitted via said second communication link by said responding slave.

8. An addressable serial peripheral interface bus arrangement according to claim 7, wherein said master is further operative, subsequent to said transmitting said target register address, to transmit one of data to be written and first dummy data via said first communication link.

9. An addressable serial peripheral interface bus arrangement according to claim 8, wherein said responding slave is operative concomitantly with said transmitted one of data to be written and first dummy data via said first communication link to echo said transmitted target register address via said second communication link.

10. An addressable serial peripheral interface bus arrangement according to claim 9, wherein said master is further operative, subsequent to said transmitting said one of data to be written and first dummy data via said first communication link, to transmit second dummy data via said first communication link, said responding slave being operative to transmit, via said second communication link and concomitantly with said transmitted second dummy data, one of an echo of said data to be written and read data responsive to said target register address.

11. An addressable serial peripheral interface bus arrangement according to claim 1, wherein said master is operative prior to said transmitting said target address to transmit, via said first communication link, an internal address of second data, said internal address common to each of said plurality of slaves.

12. An addressable serial peripheral interface bus arrangement according to claim 11, wherein said transmitted first data comprises one of said particular slave address and data responsive to said internal address of said responding slave.

13. An addressable serial peripheral interface bus arrangement according to claim 1, wherein said master is further operative to:
transmit a write command;
transmit a target register address via said first communication link substantially concomitantly with said first data transmitted via said second communication link by said responding slave;
transmit data to be written via said first communication link;
transmit, subsequent to transmitting said data to be written, dummy data via said first communication link, said responding slave operative to echo, concomitantly with said transmitted dummy data, said data to be written via said second communication link, said responding slave further operative to calculate a cyclic redundancy check on said echoed data to be written; and
compare said transmitted data to be written with said echoed data to be written, and in the event that they are consonant with each other, to generate a cyclic redundancy check for said data to be written and transmit said cyclic redundancy check via said first communication link, and
wherein said responding slave is further operative to compare said transmitted cyclic redundancy check with said calculated redundancy check of said responding slave, and only in the event that they are consonant with each other, to write said echoed data responsive to said target register address.

14. An addressable serial peripheral interface bus arrangement according to claim 1, wherein said master is further operative to:
transmit a read command;
transmit a target register address via said first communication link substantially concomitantly with said first data transmitted via said first communication link by said responding slave;
transmit first dummy data via said first communication link, said responding slave operative to transmit read data responsive to said target register address via said second communication link concomitantly with said transmitted dummy data; and
echo said transmitted read data via said first communication link and calculate a cyclic redundancy check on said echoed read data,
wherein said responding slave is further operative to compare said echoed read data with said transmitted read data, and in the event that they are consonant with each other, to generate a cyclic redundancy check for said read data and transmit said cyclic redundancy check via said second communication link, and
wherein said master is further operative to compare said transmitted cyclic redundancy check of said responding slave with said calculated redundancy check of said master, and only in the event that they are consonant with each other, to accept said echoed data.

15. A method of bus communication comprising:
providing a master;
providing a plurality of slaves;
providing for each of said provided plurality of slaves a particular slave address;
providing a clock connected to each of said master and said plurality of slaves;
providing an enable control line responsive to said master and connected to each of said plurality of slaves;
connecting said master and said plurality of slaves by a first and a second communication link, said first communication link different than said second communication link, each of said communication links constituted of a single wire link connected to a single port of said master and in parallel to each of said plurality of slaves;
transmitting, from said master via said first communication link, a target address, said transmitting associated with said provided clock and responsive to an active signal on said enable control line;
receiving, at each of said provided plurality of slaves from said master, via said first communication link, said target address;
comparing said received target address with said particular slave address; and
transmitting, only in the event said received target address is consonant with said associated particular slave address, first data via said second communication link responsive to said provided clock and said active signal on said enable control line, said transmitting slave being denoted the responding slave.

16. A method according to claim 15, further comprising for each provided slave:
presenting, in the event that said received target address is not consonant with said associated particular slave address, a high impedance towards said second communication link.

17. A method according to claim 15, wherein said target address is a broadcast address, for which no slave of said plurality of slaves is said responding slave.

18. A method according to claim 15, wherein said first data comprises said particular slave address of said responding slave.

19. A method according to claim 18, further comprising:
transmitting, from said provided master, a target register address via said first communication link concomitantly with transmitting said first data via said second communication link by said responding slave.

20. A method according to claim 19, further comprising, subsequent to said transmitting said target register address:
transmitting, from said provided master, one of data to be written and first dummy data via said first communication link.

21. A method according to claim 20, further comprising:
echoing, from said responding slave concomitantly with said transmitted one of data to be written and first dummy data via said first communication link, said transmitted target register address via said second communication link.

22. A method according to claim 21, further comprising subsequent to said transmitting said one of data to be written and first dummy data via said first communication link:
transmitting, from said master, second dummy data via said first communication link; and
transmitting, from said responding slave via said second communication link and concomitantly with said transmitted second dummy data, one of an echo of said data to be written and read data responsive to said target register address.

23. A method according to claim 15, further comprising:
transmitting, from said master prior to said transmitting said target address, an internal address of second data via said first communication link, said internal address common to each of said provided plurality of slaves.

24. A method according to claim 23, wherein said transmitted first data comprises one of said particular slave address and data responsive to said internal address of said responding slave.

25. A method according to claim 15, further comprising:
transmitting, from said master, a write command;
transmitting, from said master, a target register address via said first communication link substantially concomitantly with said first data transmitted via said second communication link by said responding slave;
transmitting, from said master, data to be written via said first communication link;
transmitting, from said master, subsequent to said transmitting of said data to be written, dummy data via said first communication link;
echoing, by said responding slave concomitantly with said transmitted dummy data, said data to be written via said second communication link;
calculating, at said responding slave, a cyclic redundancy check on said echoed data to be written;
comparing, at said master, said transmitted data to be written with said echoed data to be written;
generating and transmitting, in the event that said transmitted data to be written is consonant with said echoed data to be written, by said master a cyclic redundancy check for said data to be written, said transmitting of said generated cyclic redundancy check via said first communication link;
comparing, at said responding slave, said transmitted cyclic redundancy check with said calculated redundancy check of said responding slave; and
writing, only in the event that they are consonant with each other, said echoed data responsive to said target register address.

26. A method according to claim 15, further comprising:
transmitting, from said master, a read command;
transmitting, from said master, a target register address via said first communication link substantially concomitantly with said first data transmitted via said first communication link by said responding slave;
transmitting, from said master, first dummy data via said first communication link;
transmitting, from said responding slave, read data responsive to said target register address via said second communication link concomitantly with said transmitted dummy data;
echoing, from said master, said transmitted read data via said first communication link;
calculating, at said master, a cyclic redundancy check on said echoed read data;
comparing, at said responding slave, said echoed read data with said transmitted read data;
generating and transmitting, in the event that said compared echoed read data is consonant with said transmitted read data, by said responding slave a cyclic redundancy check for said read data, said transmitting of said generated cyclic redundancy check via said second communication link;

comparing, at said master, said transmitted cyclic redundancy check of said responding slave with said calculated redundancy check of said master; and accepting, only in the event that said transmitted cyclic redundancy check of said responding slave is consonant with said calculated redundancy check of said master, said echoed data.

27. A method comprising:

providing a plurality of slaves, each of said plurality of slaves exhibiting a plurality of addressable registers, at least one said plurality of addressable registers of a first of said plurality of slaves exhibiting a shared address with an addressable register of a second of said plurality of slaves;

connecting said provided plurality of slaves to a single master by a first and a second communication link, said first communication link different than said second communication link, each of said communication links constituted of a single wire link connected to a single port of the single master and in parallel to each of said provided plurality of slaves;

providing for each of said provided plurality of slaves a particular address;

receiving, from the single master, an enable signal at each of said provided plurality of slaves;

receiving, from the single master, a clocking signal at each of said provided plurality of slaves;

receiving, from the single master via the first communication link a target slave address;

comparing said received target slave address with said provided particular address;

receiving, from the single master via the first communication link, first data; and transmitting, in the event said received address is consonant with said particular address, second data to the master via the second communication link concomitant with said first data received via the first communication link responsive to said received enable signal being active and responsive to said received clocking signal.

* * * * *